May 16, 1944.　　　M. L. MUELLER　　　2,348,834
HEATING APPARATUS
Filed Jan. 22, 1942　　　6 Sheets-Sheet 1
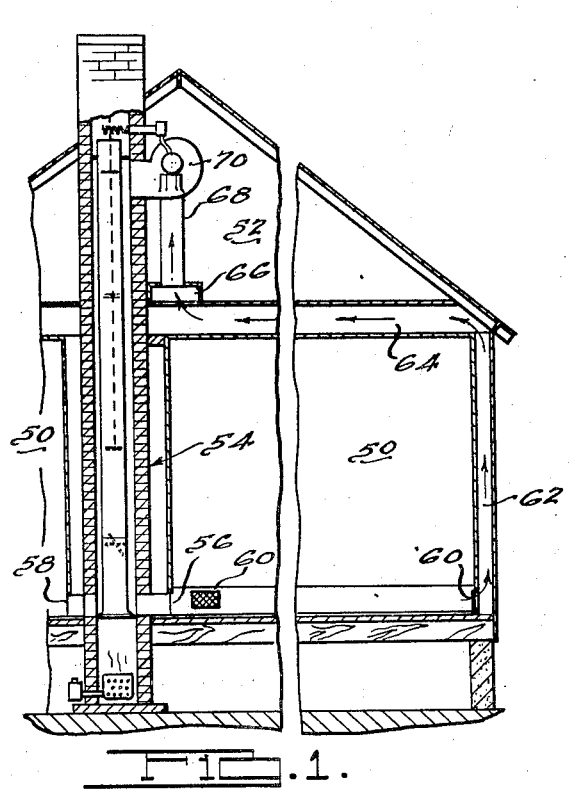
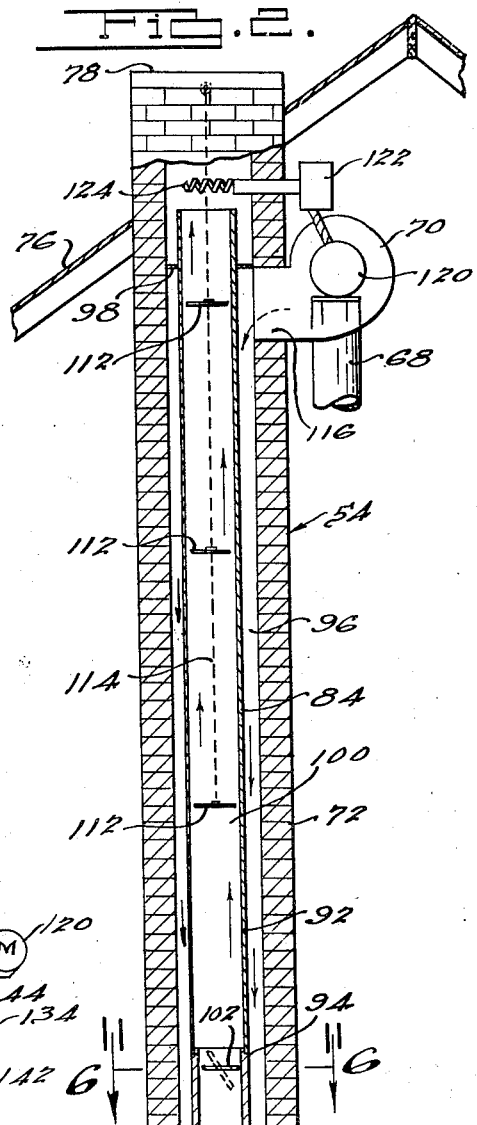
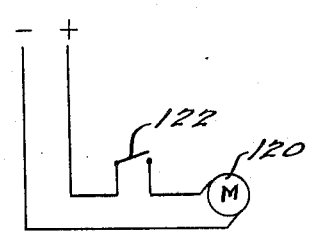
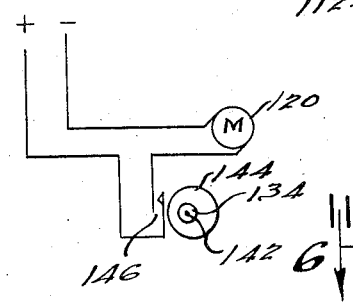
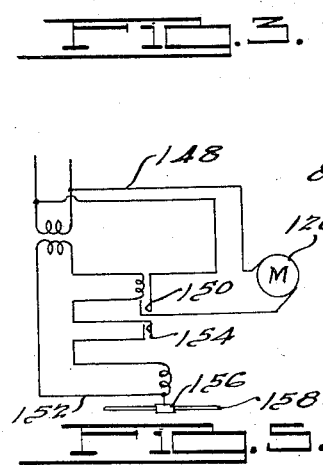
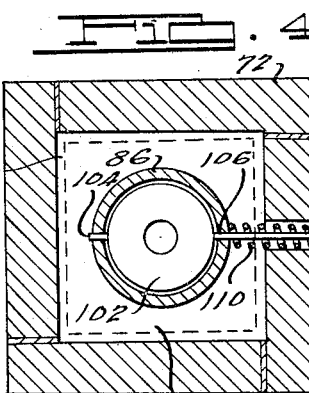
INVENTOR
Moritz L. Mueller
BY Edwin J. Balluff
ATTORNEY May 16, 1944.　　　M. L. MUELLER　　　2,348,834
HEATING APPARATUS
Filed Jan. 22, 1942　　　6 Sheets-Sheet 2
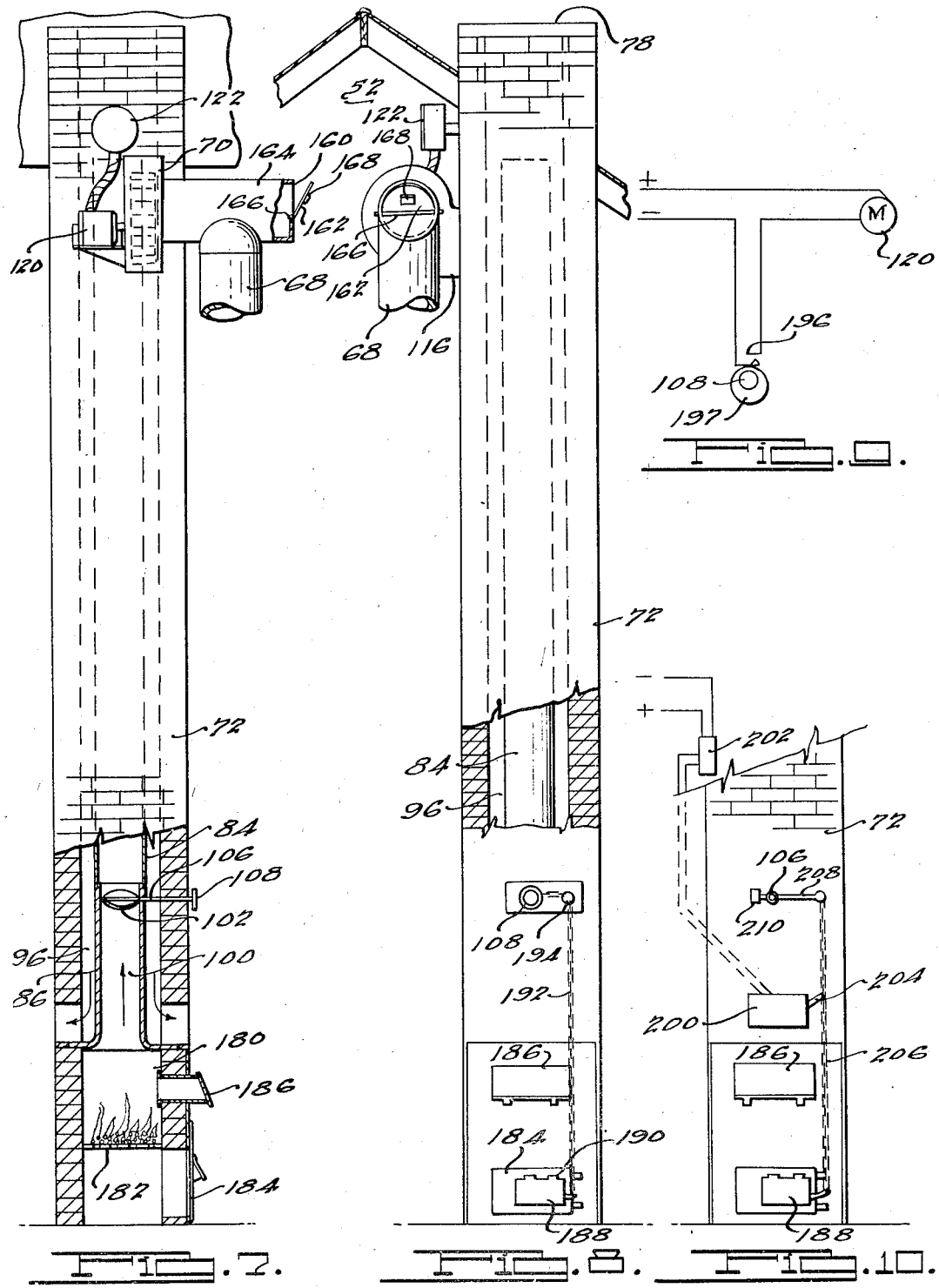
INVENTOR
Moritz L. Mueller,
BY Edwin J. Balluff
ATTORNEY May 16, 1944.　　M. L. MUELLER　　2,348,834
HEATING APPARATUS
Filed Jan. 22, 1942　　6 Sheets-Sheet 3
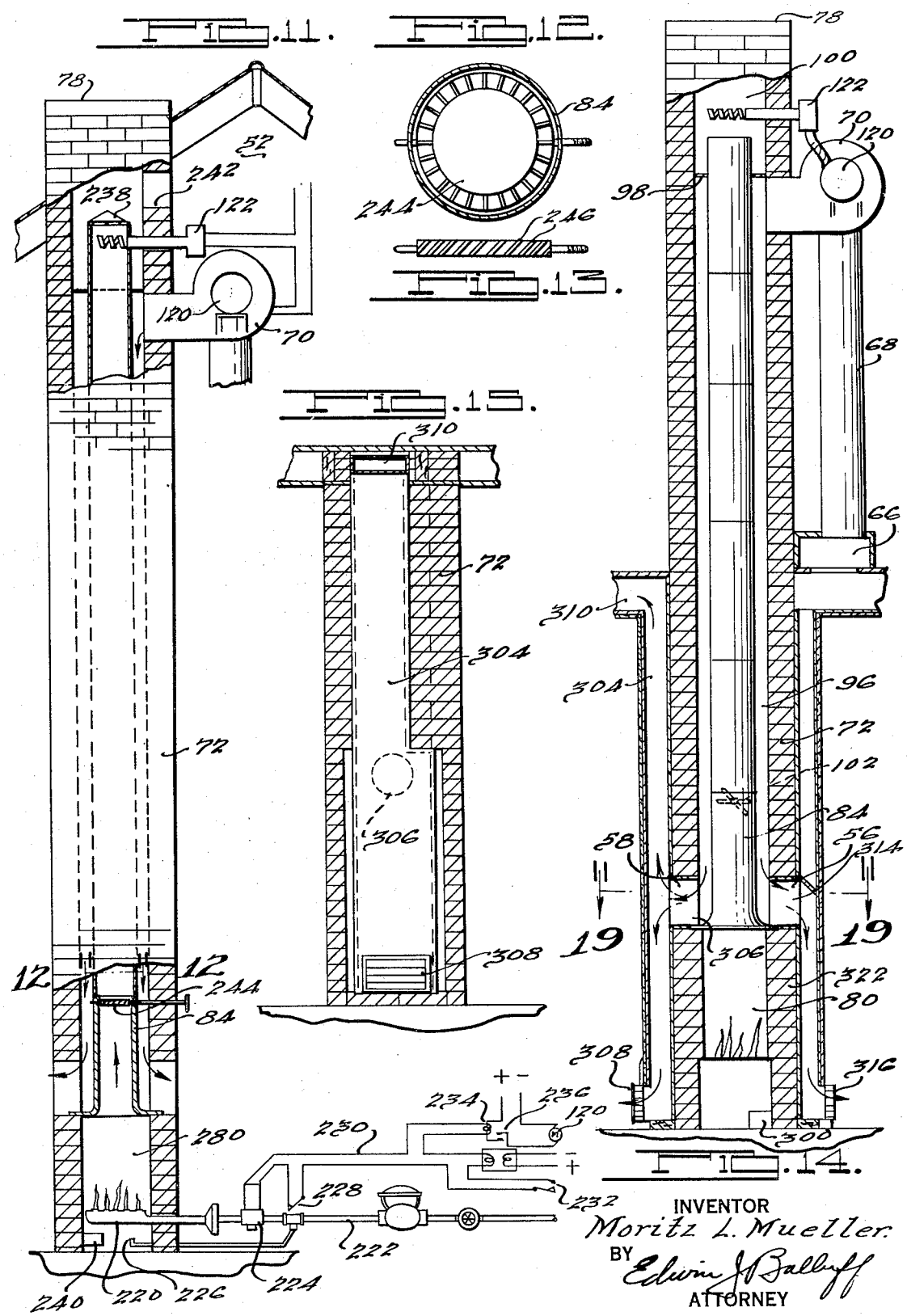

May 16, 1944.　　　M. L. MUELLER　　　2,348,834
HEATING APPARATUS
Filed Jan. 22, 1942　　　6 Sheets-Sheet 4
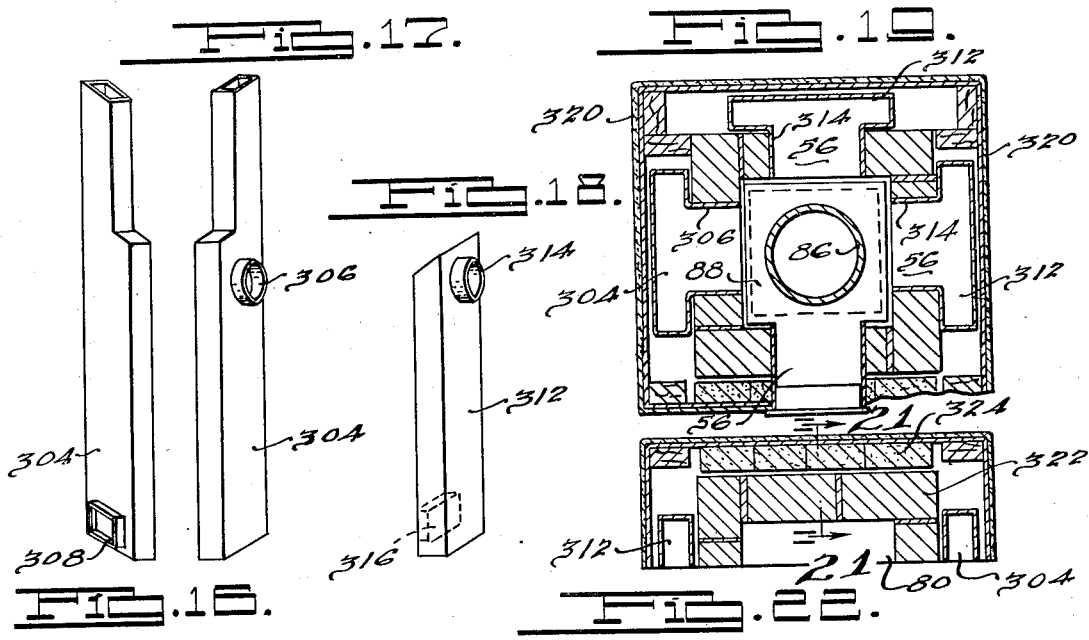
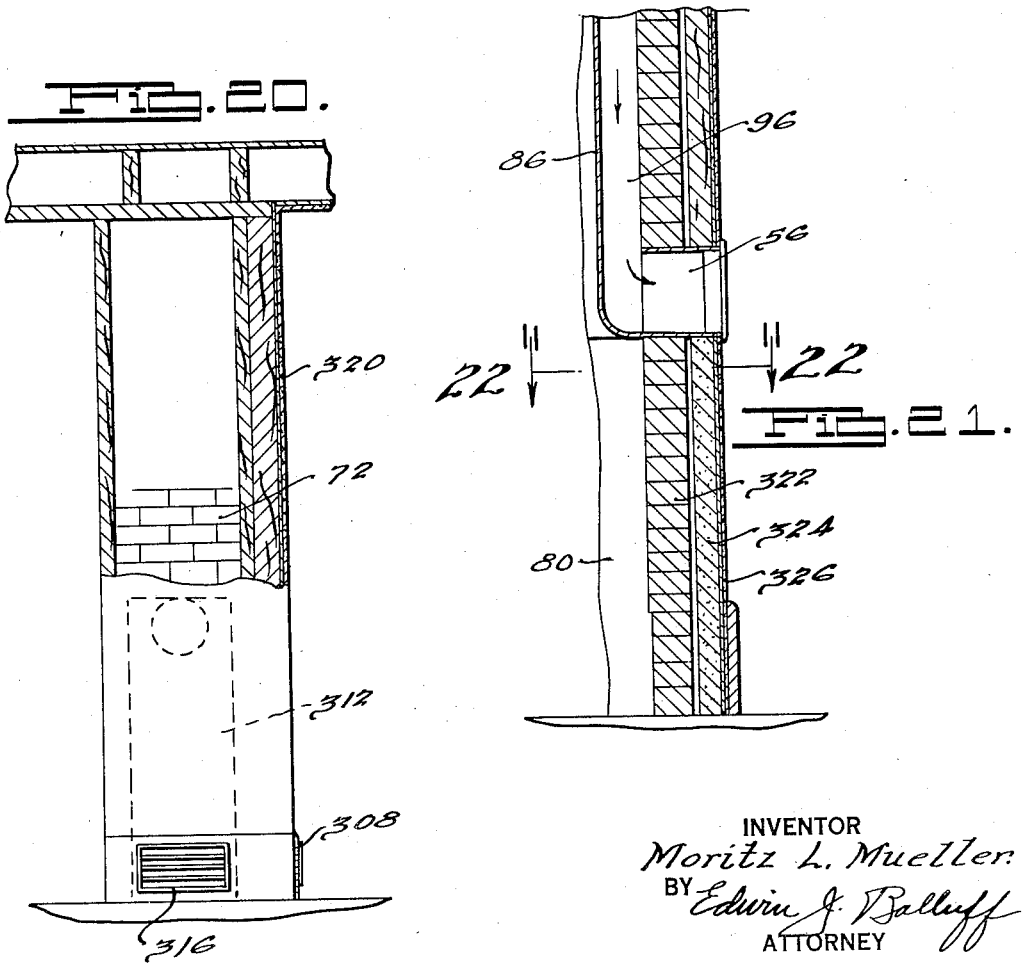
INVENTOR
Moritz L. Mueller.
BY Edwin J. Balluff
ATTORNEY

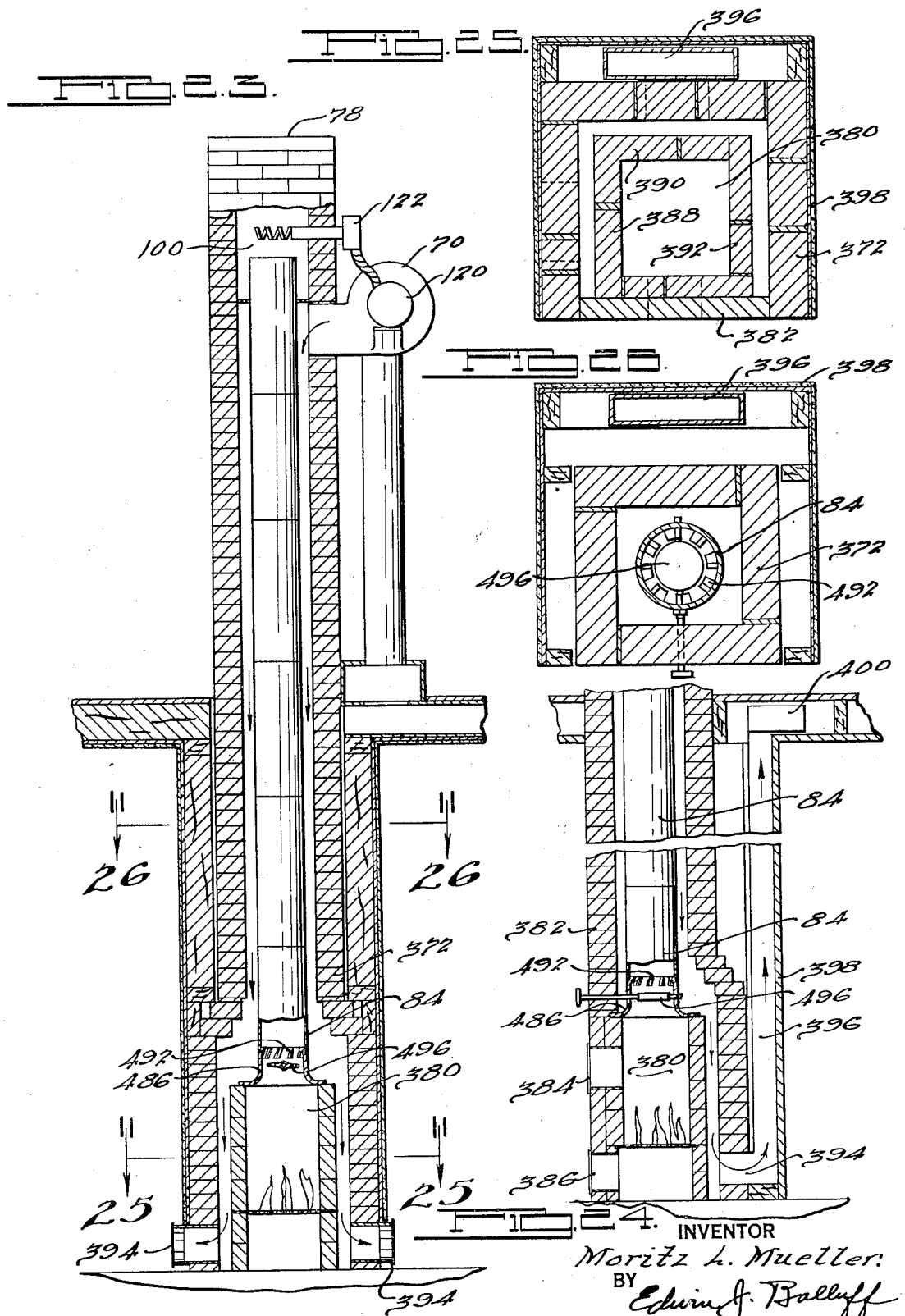

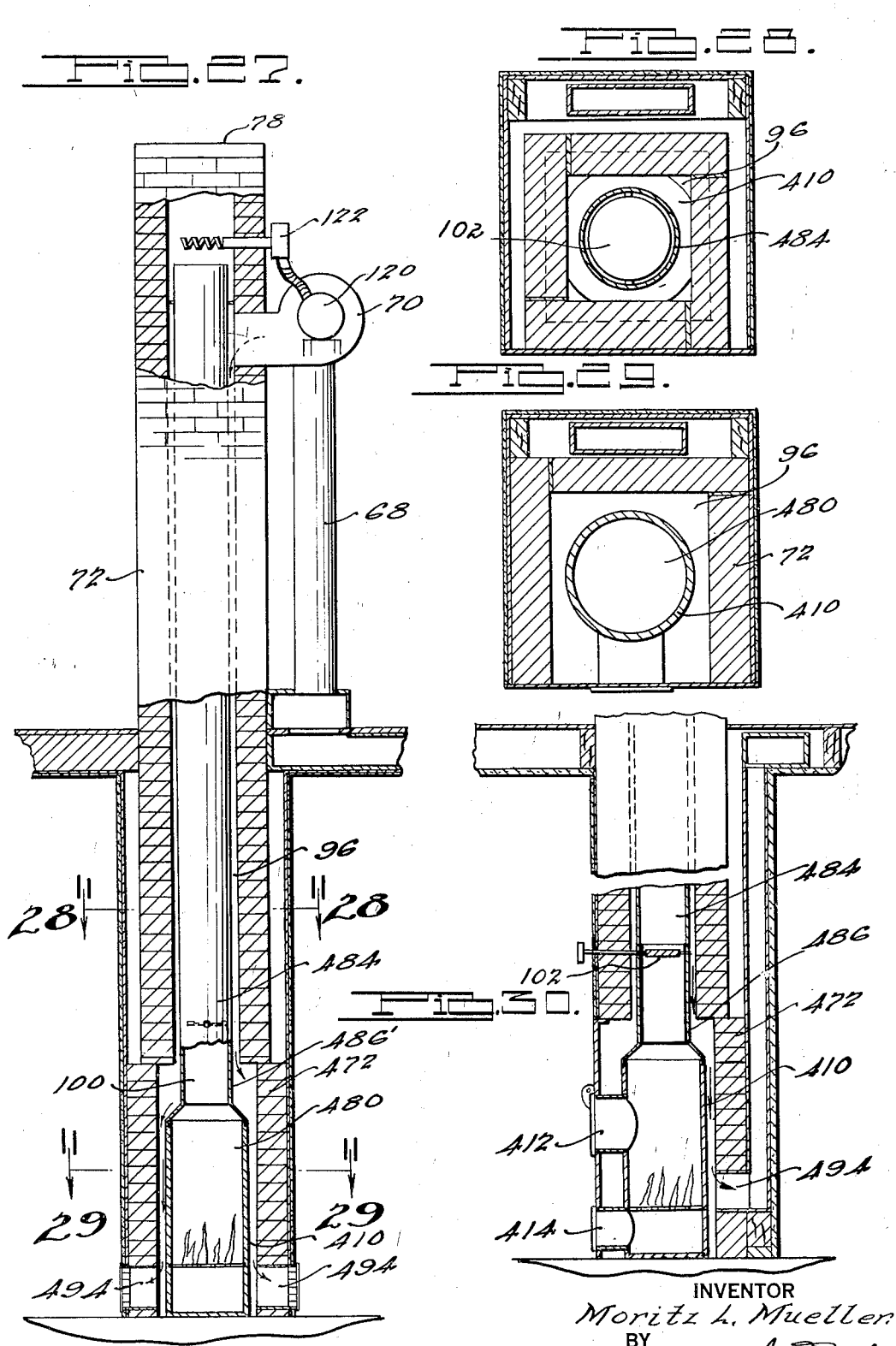

Patented May 16, 1944

2,348,834

UNITED STATES PATENT OFFICE 2,348,834

HEATING APPARATUS

Moritz L. Mueller, Detroit, Mich., assignor, by mesne assignments, to Moritz L. Mueller and John H. Mueller, Seattle, Wash., as joint tenants Application January 22, 1942, Serial No. 427,734

14 Claims. (Cl. 237—55)

This invention relates to heating apparatus and has particular reference to a heating system for supplying heated air to a space in a building to be occupied by and for the comfort of human beings.

A principal object of the invention is to provide a novel and improved type of heating apparatus which is efficient in operation and inexpensive and simple in construction.

Another object of the invention is to provide a simplified and inexpensive type of heating apparatus which is particularly adapted although not limited for use in low cost homes and buildings and particularly those in which no basement is provided.

Another object of the invention is to provide a new type of heating apparatus comprising a chimney or flue furnace in which the heat exchange part of the system is arranged in the chimney directly above the combustion chamber in the lower part thereof and in which means are provided for effecting a forced circulation of air in intimate countercurrent heat exchange relationship with the combustion products and thence into the space in the building to be heated.

Other objects and advantages of the invention will be apparent from a consideration of the following specification taken in conjunction with the accompanying drawings, of which there are six sheets and wherein:

Fig. 1 is a vertical cross section through a part of a house illustrating one form of heating system embodying the invention and the method of circulating the air to be heated through the heating system and the house;

Fig. 2 is an enlarged vertical sectional view of a part of the heating system illustrated in Fig. 1;

Fig. 3 is a diagram of a control circuit for the system illustrated in Figs. 1 and 2;

Fig. 4 is a diagram of a modified form of control circuit for the system illustrated in Figs. 1 and 2;

Fig. 5 is a diagram of a modified form of control circuit for the system illustrated in Figs. 1 and 2;

Fig. 6 is a horizontal sectional view taken in a plane along the line 6—6 of Fig. 2, looking in the direction of the arrows;

Fig. 7 is a view similar to Fig. 2 and illustrating a modified form of construction;

Fig. 8 is a side elevational view of the construction illustrated in Fig. 7 with certain parts thereof broken away;

Fig. 9 is a diagram of a modified form of control circuit which may be employed with the heating system illustrated in Figs. 7 and 8;

Fig. 10 is a fragmentary view similar to Fig. 8 and illustrating a modified form of control;

Fig. 11 is another view similar to Figs. 2 and 7 but illustrating a different form of combustion burner and control therefor;

Fig. 12 is a sectional view taken in a plane along the line 12—12 of Fig. 11;

Fig. 13 is a side elevational view of the draft restricting device illustrated in Fig. 12;

Fig. 14 is a view similar to Figs. 2, 7 and 11 and illustrating a modified form of construction;

Fig. 15 is a side elevational view of one side of the apparatus shown in Fig. 14 with the finished wall removed;

Figs. 16, 17 and 18 are perspective views of certain of the parts of the apparatus illustrated in Fig. 14;

Fig. 19 is a view taken in a plane along the line 19—19 of Fig. 14;

Fig. 20 is another side view, with parts broken away, of the structure illustrated in Fig. 14;

Fig. 21 is a vertical section taken through the back wall of the apparatus illustrated in Fig. 14 and along the line 21—21 of Fig. 22;

Fig. 22 is a section taken along the line 22—22 of Fig. 21;

Fig. 23 is a view similar to Figs. 2, 7, 11, and 14 and illustrating a modified form of construction;

Fig. 24 is a partial view similar to Fig. 23 and of the apparatus therein illustrated but taken in a plane at right angles to the view as illustrated in Fig. 23;

Fig. 25 is a section along the line 25—25 of Fig. 23, looking in the direction of the arrows;

Fig. 26 is a section along the line 26—26 of Fig. 23, looking in the direction of the arrows;

Fig. 27 is a view similar to Figs. 2, 7, 11, 14 and 23 but illustrating a modification thereof;

Fig. 28 is a sectional view taken along the line 28—28 of Fig. 27;

Fig. 29 is a sectional view taken along the line 29—29 of Fig. 27; and

Fig. 30 is a fragmentary view of the structure illustrated in Fig. 27 but taken in a plane at right angles to the view as illustrated in Fig. 27.

Referring now to Figs. 1 to 6, there is illustrated a part of a house or dwelling having one or more rooms 50 to be heated with an attic space 52 arranged between the roof of the dwelling and the ceiling of the space to be heated. A heating system is provided for heating the space 50 and comprises in general a chimney or flue furnace indicated generally at 54 having heated or warm air discharge outlets such as 56 and 58 for supplying heated air to the space in the rooms 50. Return air outlets 60 may be formed in the walls of the heated space and communicate with ducts such as 62 formed in the walls of the building for conducting air from the room back to the intake side of the heating system, the duct 62 communicating at its upper end with a duct 64 which communicates with a header 66 from which a conduit 68 conducts air to the intake side of a blower 70 which discharges the air under pressure into the chimney or flue furnace.

The chimney or flue furnace comprises, as illustrated in Figs. 2 and 6, a masonry chimney 72 adapted to rest upon a suitable footing 74, said chimney extending upright to and above the roof 76 of the building and having an atmospheric discharge 78 external of the space to be heated. The combustion chamber 80 is provided in the lower portion of the chimney and has therein suitable means for burning fuel under natural draft conditions, such as an atmospheric or pot type oil burner 82. A heat exchanger 84 is arranged within the chimney 72 and extends for a substantial portion of the length of the chimney. The heat exchanger member 84 comprises a tubular foot 86 having a continuous flange 88 which is adapted to seat on and be supported by an annular ledge 90 formed internally of the chimney 72 above the combustion chamber 80. The foot 86 may be a casting and have walls of materially greater thickness than the part of the heat exchanger 84 thereabove which may comprise one or more pieces of sheet metal stove pipe 92, the lower end of which is frictionally fitted to a suitable seat 94 formed on the upper end of the foot 86. The upper end of the heat exchanger 84 terminates below the discharge outlet 78 of the chimney 72 and, as illustrated in Figs. 2 and 6, is arranged in spaced relationship with the inside wall of the chimney 72 so as to provide a path 96 for the downward flow of air over the outside surface of the heat exchanger 84. The path 96 is closed at the upper end by a plate 98 which extends transversely of the inside of the chimney 72 and which plate 98 is provided with an opening through which the heat exchanger 84 extends, the plate 98 functioning to maintain the upper end of the heat exchanger 84 in position and forming a seal between the air path 96 and the path 100 of the flue gases.

The burning of fuel in the combustion chamber 80 generates heated products of combustion which pass upwardly through the path or passageway 100, formed by the inside of the heat exchanger 84 and the inside of the chimney 72 thereabove, to the outlet 78 where such products of combustion are discharged into the atmosphere. The flue passageway 100 is vertically disposed and is substantially straight from the combustion chamber 80 to the discharge outlet 78 and will produce a high potential draft or vacuum so as to induce the flow under natural draft of the products of combustion from the combustion chamber 80 to atmosphere. The air to be heated in flowing through the path or passageway 96 is in intimate heat exchange relationship with the flue gases flowing upwardly through the flue or passageway 100 and under a materially greater pressure than the flue gases so that if there is any leakage between paths 96 and 100, it will be of air into the flue passageway. In view of the high potential draft created by the vertical flue, an adjustable draft restricting device or damper 102 is utilized for reducing the effective draft within the combustion chamber 80. The damper may comprise an annular plate, the outer periphery of which is slightly smaller than the inside circumference of that part of the flue provided by the foot 86.

The damper 102 is pivotally mounted on trunnions 104 and 106 journaled in the foot 86, the trunnion 106 being extended through an opening in the side wall of the chimney 72 and provided with a handle 108 for adjusting the position of the damper within the flue for controlling the effective draft acting on the flue gases within the combustion chamber 80. A spring 110 confined between the outside of the foot 86 and the handle 108 and disposed around the shaft 106 may be provided for holding the damper 102 in any selected position. As the potential draft due to the straight flue is materially greater than that needed to support efficient combustion in the chamber 80, the damper 102 is preferably arranged somewhere between the position in which it is illustrated in Fig. 6 and the dotted line position illustrated in Fig. 2 for restricting the draft which may act on the flue gases in the combustion chamber 80 and so as to obtain a draft of approximately .08" of vacuum.

An alternative or additional form of draft restricting device may be provided and consists of a series of baffles or plates 112 of smaller cross sectional area than the cross sectional area of the flue 100 and supported in spaced relation upon a chain 114. The chain 114 may be fastened in any desired way to an upper part of the chimney 72 and the chain 114 with the baffles 112 thereon will depend into the flue 100. The baffles 112 will cooperate with the heat exchanger 84 to provide one or more annular passageways in the flue 100 and adjacent the wall of the heat exchanger 84 so as to cause the heated flue gases to flow in intimate contact with the wall of the heat exchanger 84 thereby expediting heat exchange with the air flowing through the path 96.

The blower 70 may comprise a pressure type of air moving means and be arranged so as to force air under pressure into the upper end of the air path 96, the discharge end 116 of the blower being arranged in a suitable opening in the wall of the chimney immediately below the partition 98 so that the air discharged from the blower 70 is forced under pressure downwardly through the path 96. The discharge end 116 of the blower may be arranged so as to discharge air tangentially into the path 96 so as to cause it to move in a spiral direction downwardly through the path 96 and around the heat exchanger 84. As previously indicated, the intake side of the blower is connected with the space which is heated so as to be supplied with air therefrom. The flange 88 on the bottom of the foot 86 and seated on the ledge 90 forms the lower end of the air path 96 and one or more air discharge openings 56, 58 are provided so that the air which flows through the path 96 may be delivered directly or through suitable conduits to the space 50 to be heated.

As illustrated in Fig. 1, the chimney 72 is concealed by internal walls of the dwelling and the discharge outlets 56 and 58 extend through such walls so that the air which passes through the heating system will be discharged into the space to be heated in the dwelling. In Fig. 2 the building walls around the chimney have been omitted. The blower 70 is adapted to be driven by an electric motor 120, the circuit for which is controlled by a thermostatic switch 122 which is operated by a thermal element 124 arranged in the flue passageway 100 immediately above the upper end of the exchanger 84. The switch 122 may be set to close the motor circuit when the flue gas temperature reaches a certain degree, say, for example, 225° F., and to break the motor circuit when the flue gas temperature drops below a certain degree, say, for example, 200° F. The control circuit is diagrammatically illustrated in Fig. 3.

Oil from a reservoir (not shown) is supplied to an oil control valve 132 which may be provided with a manual control 134 by means of which the rate of flow of oil to the burner 82 and through the oil line 136 may be regulated. The valve 132 may be a conventional float controlled valve which is adapted to pass oil to the burner 82 and to control the rate of flow of oil to the burner 82.

The burner 82 comprises an atmospheric or heat vaporizing type of burner and includes a pot provided with suitable air openings thereinto for supplying air to the burner and the combustion chamber for supporting combustion therein and to provide also a combustible mixture of fuel and air. The pot burner 82 may include a plate 138 extending transversely of the chimney and having an opening therein above the pot 82 so as to permit the combustion of the oil vapors within the combustion chamber 80. The pot 82 may be supported by the plate 138 and an air intake opening 140 is provided in the chimney below the burner 82 for supplying air thereto.

A suitable door may be provided in the wall of the combustion chamber 80 for obtaining access thereto in order to light the burner 82, which may be done by throwing a lighted flare into the pot 82 when there is oil therein. If the valve 132 is set for a pilot flame, the burner 82 will operate with a pilot flame. The products of combustion from the pilot flame will not create sufficient heat to close the switch 122 and operate the blower 70. However, when the valve 132 is adjusted so as to increase the supply of fuel to the burner 82, the heated products of combustion will cause the thermostatic element 124 to close the switch 122 and thereby operate the blower 70 which, as previously explained, will circulate air to be heated through the path 96 and thence through the discharge outlets 56 and 58 into the space to be heated.

In lieu of the thermostatic switch 122, the motor 120 for operating the blower 70 may be controlled by a manually operated switch and as illustrated in the control circuit disclosed in Fig. 4. According to this method of controlling the blower motor circuit, the control 134 of the oil control valve 132 and which is rotatable about the vertical axis 142 for regulating the control 132 is provided with a rotary cam 144 which is adapted to close the contacts of a normally open switch 146 which is adapted to make and break the circuit for the motor 120. The cam 144 is set so that when the valve 132 is on pilot flame position, the switch 146 will be opened. As the control 134 is turned in a counterclockwise direction about the axis 142 to increase the supply of oil to the burner 82, the cam 144 is adapted to close the switch 146 and thereby energize the circuit of the motor 120, which circuit will remain closed until the valve 132 is returned to its pilot flame position. According to this method, the blower is actuated when the oil supply to the burner 82 is increased and cut off when the oil supply to the burner 82 is decreased.

In Fig. 5 a modified form of control for the motor 120 is illustrated and comprises a primary circuit 148 in which the motor 120 is arranged, said circuit being controlled by a relay switch 150 and a secondary circuit 152 having a relay therein for controlling the switch 150 and a thermostatic switch 154 adapted to be arranged in the space to be heated and designated as a room thermostat. The circuit 152 is also adapted to control a magnetically controlled valve 156 which is adapted to control the supply of oil through the oil line 158 directly to the burner 82. When the control hook-up illustrated in Fig. 5 is used, the valve 132 and the thermostatic switch 122 would not be used. When the room thermostatic switch 154 is open, the valve 156 is closed except for the flow of a sufficient amount of oil to support a pilot flame in the burner 82 and the switch 150 is open whereby the blower motor 120 is at rest. When the switch 154 is closed to call for heat in the space to be heated, the secondary circuit 152 will be closed and will open the valve 156 thereby permitting an increased supply of oil to the burner 82 and will close the switch 150 thereby operating the motor 120 and blower 70 which will continue to operate as long as the switch 154 remains closed. If the current fails, the valve 156 will close thereby reducing the fire in the combustion chamber 80 to a pilot flame. Thus when the control illustrated in Fig. 5 is used, if the current supply is interrupted thereby stopping the blower 70, the supply of oil to the burner will be cut down immediately in order to prevent overheating of the heating system.

In order to prevent overheating of the heating system if the blower 70 should fail to operate even though the motor circuit therefor is closed in the case of the controls illustrated in Figs. 3, 4, and 5, and to prevent overheating of the heating system when the controls illustrated in Figs. 3 and 4 are used and the current supply is interrupted, there is provided a bleed or vent for the air path 96, the construction of which does not show in Fig. 2, but is illustrated in Figs. 7 and 8. This air bleed or vent comprises a damper controlled opening 160 and a pivoted damper 162, the opening 160 being provided in the conduit 68 which supplies air from the space to be heated to the intake side of the blower 70. The opening 160 may comprise the open end of the upper portion of pipe 164, the other end of which is secured to the fan casing 70 around the air intake opening therein. The damper 162 comprises a semi-circular plate pivoted at 166 and which is adapted to assume the position illustrated in Fig. 7 when the blower 70 is at rest and to close the opening 160 when the blower is operating. A weight 168 may be fastened to the damper 162 for causing the same to open. When the blower 70 is operated, the rush of air into the pipe 164 through the opening 160 will suck the damper 162 to its seat to close the opening 160, thereby causing the blower 70 to draw the air through the conduit 68 as described more particularly in connection with Fig. 2. When the blower 70 is at rest, therefore, the upper end of the air path 96 is vented through the fan 70, pipe 164 and opening 160 to the attic 52 of the dwelling, and as the air discharges 56 and 58 of the air path 96 are open, it will be apparent that if the blower 70 is stopped and the heat exchanger 84 is heated, a gravity circulation of air upwardly through the path 96, blower 70, pipe 164, and opening 160 will be provided for dissipating the heat from the heating system. This air bleed comprises a means for dissipating heat from the heating system when the blower 70 fails to operate when heated products of combustion in excess of that created by a pilot flame are being generated in the combustion chamber. This air bleed is more necessary in connection with the controls illustrated in Figs. 3 and 4 than in connection with the control illustrated in Fig. 5, but may be used with all of these controls and preferably is used in connection with the controls illustrated in Figs. 3 and 4 and with all of the embodiments of the invention herein illustrated. If desired, a thermostatic control for opening and closing the damper 162 may be utilized and arranged so as to open the damper when the temperature of the air in the upper end of the path 96 reaches a predetermined degree and to close the damper 162 when the temperature of the air at the upper end of the air path 96 falls below a certain degree. In this way the damper 162 will be closed except when the blower 70 fails to operate and the temperature of the air at the upper end of the air path 96 is at or above a predetermined degree.

The modification illustrated in Figs. 7 and 8 differs from that illustrated in Fig. 2 only in that the chimney furnace illustrated in Figs. 7 and 8 is adapted for burning hard fuel such as coal. The construction of the chimney 72, the heat exchanger 84, the blower 70, the thermostatic switch 122, the damper 102, and other parts, except as hereinafter noted, are the same as that illustrated in Fig. 2 so the same reference characters have been employed to designate similar parts.

The combination chamber 180 is adapted for burning hard fuel and is provided with a suitable grate 182 and an ash pit door 184. A feed door 186 for supplying fuel to the combustion chamber 180 is also provided. The ash pit door 184 is provided with a draft door 188 pivoted at 190 and connected by a cable 192 to the hand control 108 which operates the damper 162. The cable 192 passes over a pulley 194 and the draft door 188 is correlated with the damper 102 so that both the draft door 188 and the damper 102 may be controlled by the handle or knob 108 in such a way that the draft door may be open when the damper is open and the draft door will be closed when the damper is closed. The thermostatic switch 122 will open and close the circuit of the blower motor 120 in accordance with the temperature of the flue gases at the upper end of the flue gas passageway 100. When the blower 70 is stopped, the damper controlled bleed 160 will prevent the overheating of the heating system and permit a gravity circulation of air upwardly through the air passageway 96.

In Fig. 9 there is illustrated a modified form of control for the heating systems illustrated in Figs. 7 and 8 which consists of a normally open switch 198 which is adapted to be closed by a cam 197 on the control knob 108 and which switch 196 is adapted to close the motor circuit when the draft is increased and to open the motor circuit when the draft is closed.

In Fig. 10 a second modified form of control for the heating system illustrated in Figs. 7 and 8 is illustrated and comprises a conventional lever motor 200 which is operated each time the room thermostatic switch 202 is opened or closed to correspondingly close and open the draft door 188. The arm 204 of the lever motor is connected to a cable 206, one end of which is connected to the draft door 188 for raising and lowering the same and the other end of the cable 206 is connected to one end of a counterweighted crank 208 affixed on the shaft 106 on which the damper is mounted, the crank 208 being provided with a counterweight 210 for turning the damper when the draft 188 is opened. The blower circuit illustrated in Fig. 3 may be used in connection with the modification illustrated in Fig. 10.

Figs. 11, 12 and 13 illustrate a modification of Figs. 2 and 7 wherein the combustion chamber 280 is provided with means for burning a gaseous fuel. The construction illustrated in Fig. 11 is the same as that illustrated in Figs. 2 and 7 except for the gas burner and its control, and therefore the same reference characters have been used in Fig. 11 as have been used in Fig. 2 to designate corresponding parts. The blower 70 in the modification illustrated in Fig. 11 may be controlled by a thermostatic switch 122 arranged in a circuit as illustrated in Fig. 3. This modification also may include the means for dissipating heat from the chimney furnace, as illustrated in Figs. 7 and 8, in the event the blower 70 fails to operate.

The burner in Fig. 11 comprises a gas burner 220 arranged in the bottom of a combustion chamber 280 which is also provided with an air intake opening 240. The burner 220 is adapted to be supplied with the gaseous fuel from a gas supply line 222 under the control of a solenoid gas valve 224. A pilot 226 for igniting the burner 220 is provided and the operation of the pilot is adapted to maintain closed a thermostatic pilot switch 228 arranged in a secondary circuit 230 which further includes a room thermostatic switch 232. When the switch 232 is closed and if the pilot switch 228 is closed due to the operation of the pilot 226, the valve 224 will open and permit a flow of gas to the burner 220 which will then be ignited by the pilot 226. The secondary circuit 230 also includes a relay 234 which operates a switch 236 in the circuit of the blower motor 120. This may be used in lieu of the control circuit for the blower illustrated in Fig. 3. Therefore, when the burner 220 is operating, the blower 70 will be operated therewith and when the room thermostat 232 opens, thereby indicating that the demand for heat is satisfied, the burner 220 will be turned off and the blower 70 will stop.

A back draft deflector 238 spaced from and overlying the upper end of the heat exchanger is provided in the modification illustrated in Fig. 11, as well as a back draft diverter in the form of an opening 242 into the attic space 52 of the building. The form of draft reducing device as illustrated in this modification may be used in any of the other embodiments of the invention and consists of an adjustable circular plate 244 supported in the heat exchanger 84 as illustrated in Figs. 11 and 12. The plate 244 is provided with spiral slots 246 in its periphery and is spaced slightly from the inside of the heat exchanger 84 so as to provide an annular path between the plate 244 and the heat exchanger 84 for the flue gases. The spiral slots 246 tend to give the flue gases a spiral motion so as to expedite the transfer of heat therefrom and through the wall of the heat exchanger 84. The plate 244 is set in position to create the desired amount of draft in the combustion chamber 280.

In the modification illustrated in Figs. 14 to 22 inclusive, the construction of the chimney furnace is identical to that illustrated in Figs. 2, 7 and 8 except that no specific form of fuel burning device is illustrated in Fig. 14, and hence the same reference characters will be applied to corresponding parts in Figs. 14 to 22. The fuel burning means illustrated in either Figs. 2, 7, 10 or 11 and the controls therefor may be used in connection with the chimney furnace illustrated in Fig. 14, or any other desired form of fuel burning apparatus and controls therefor may be used. The combustion chamber 80 of the modification illustrated in Fig. 14 is adapted to supply heated products of combustion to the flue passageway 100 formed interiorly of the heat exchanger 84 and blower 70 is adapted to circulate air in countercurrent heat exchange relationship with the heat exchanger 84 and through the path 96, such air being discharged through outlets such as 56 and 58. The bottom of the combustion chamber 80 is provided with some suitable air intake openings such as indicated at 300 for supplying air to whatever form of fuel burning apparatus is arranged in the combustion chamber 80, the fuel burning apparatus preferably being of the type which will operate under natural draft conditions due to the high potential draft created by the flue 100, and an adjustable draft restricting device 102 is provided to obtain the desired draft in combustion chamber 80.

The chimney furnace illustrated in Figs. 14 to 22 may be supported upon the floor of the space which is being heated and be concealed by finished walls which are built around the chimney furnace and which have various hot air ducts therein, as hereinafter explained.

As illustrated in Fig. 15, one face of the chimney furnace has associated therewith a sheet metal duct 304 which has a thimble 306 which fits within the opening 58. The duct 304 extends along the face of the chimney and is provided with a discharge outlet 308 for discharging air into one of the rooms of the house. At its upper end the duct 304 communicates with a lateral duct 310 which may be arranged between the joists which form the ceiling above the space opposite the lower part of the chimney furnace. The duct 304 may be formed as a preassembled unit, as illustrated in Figs. 16 and 17, and be secured in position on one of the faces of the chimney furnace for conducting the air from one of the discharges 58 to the floor of the room, as well as to a ceiling duct for delivery to a distant part of the house, or to the upper part of the room next to the chimney.

As illustrated in Figs. 14, 19 and 20, one or more faces of the chimney furnace may be provided with ducts 312 for conducting the heated air from discharge outlets such as the outlets 56 down to the floor level. Such a duct is illustrated in Fig. 18 and may consist of an elongated conduit having a thimble or sleeve 314 adapted to fit in one of the openings 56 and a discharge outlet 316 adapted to discharge air laterally close to the floor of the space to be heated. The ducts 304 and 312 may be concealed within finished walls 320 which are built around the outside of the chimney furnace so as to provide finished walls of rooms in the space heated by the chimney furnace. An outlet 56 from one or more sides of the chimney furnace may discharge laterally into the space to be heated directly from the lower end of the air path 96 as illustrated in Fig. 21, thereby providing space therebelow for a door (not shown) into the combustion chamber 80.

In view of the fact that the chimney furnace illustrated in Fig. 14 is arranged within finished walls which may contain building materials made out of wood, the walls of the combustion chamber 80, in the modification illustrated in Fig. 14, it may be made out of fire brick 322 so as to cut down the heat transfer through the walls which form the combustion chamber, and on that side of the chimney furnace which does not have a warm air register located at the base of the chimney, as illustrated in Figs. 21 and 22, insulating brick 324 may be utilized between the walls of the combustion chamber and the finishing material 326 which forms the outside surface of the wall 320, the finishing material 326 in this case being applied directly to the outside of the insulating brick 324.

In the modification illustrated in Figs. 23, 24, 25 and 26, the chimney furnace construction may be the same as that illustrated in Figs. 14 to 22, except in the following particulars:

In this instance the combustion chamber 380 may be formed by walls, some of which are independent of the walls of the chimney. The chimney 372 is widened at its base as illustrated in Figs. 23, 24 and 25 on three sides, the fourth side 382 being provided with a door 384 for obtaining access to the combustion chamber 380. Another opening 386 in the bottom of the wall 382 may be provided to serve as an air inlet for the combustion chamber 380, and this opening 386 may have a suitable door for controlling the opening. The combustion chamber is formed by the wall 384 and by walls 388, 390, and 392, and the walls 388, 390 and 392 being in spaced relationship with the corresponding walls of the chimney 372. The foot 486 of the heat exchanger 84 is supported by the walls 382, 388, 390 and 392, and the products of combustion generated in the combustion chamber 80 pass upwardly through the heat exchanger 84, as indicated in the other modifications.

In this embodiment of the invention the foot 486 is comparatively short as compared with the length of the corresponding parts used in the other embodiments herein illustrated. The foot 486 may be provided with a series of spiral veins 492 formed integrally therewith and adjacent the upper end thereof for imparting a spiraling motion to the flue gases in their upward flow through the flue passageway. A suitable draft restricting device 496 may be arranged in the flue and within the foot 486 below the spiral baffles 492. The outside circumference of the damper 496 is slightly less than the circular area of the flue defined by the inner ends of the spiral baffles 492 and the damper 496 may be mounted on trunnions as illustrated in order to control the effective draft within the combustion chamber 480. The foot 486, baffles 492 and damper 496, as illustrated in Figs. 23 to 26, may be used in any of the other embodiments of the invention illustrated herein in lieu of the corresponding parts therein illustrated.

As the walls 388, 390 and 392 are spaced from the walls of the chimney 372, the air which flows downwardly over the heat exchanger 84 will flow downwardly over the walls 388, 390 and 392 and be discharged from suitable outlets such as 394 formed in the bottom of the chimney wall 372 on three sides thereof. One of the outlets 394 may communicate with a duct 396 concealed by the finished wall 398 which is built around the chimney 372, said duct 396 communicating at its upper end with a lateral duct 400 for conducting air to a distant part of the space to be heated. Except in the foregoing particulars, the construction and operation of the heating system illustrated in Figs. 23 to 26 will be the same as that disclosed in connection with Figs. 1 to 22, depending of course upon the type of fuel that may be used and the particular type of controls. As previously indicated, all of the embodiments of the inventions illustrated herein may include the means for dissipating heat from the system when the blower 70 is inoperative and as disclosed in Figs. 7 and 8.

The construction disclosed in Figs. 27 to 30 is a modification of that disclosed in the other embodiments, but differs therefrom in that the combustion chamber 480 is formed by metal walls upon which the heat exchanger 484 is supported. The chimney 472 is provided with one or more discharge outlets 494 for heated air at the lower end thereof and the combustion chamber 480 is formed by a metal tank or shell 410 which is arranged in spaced relationship with the inside walls of the chimney 472 and provided with suitable door controlled openings 412 and 414 so as to provide access to the combustion chamber and to provide an air supply therefor. Any desired form of fuel burning apparatus may be arranged within the combustion chamber 480, preferably one which is adapted for burning fuel under natural draft operation, such for example, as those disclosed in any of the other figures hereof. Here again the outside walls of the chimney 472 may be finished to provide finished wall surfaces of a living room in the dwelling house in which the heating system is arranged.

In this embodiment of the invention, as well as that disclosed in Figs. 23 to 26, the same reference characters are employed to designate the parts when they are the same as those illustrated in the other embodiments of the invention herein disclosed. The walls of the shell 410 are at least as thick as the walls of the foot 486' of the heat exchanger 484 and the thickness of the wall of the foot 486' is materially greater than the walls of the heat exchanger thereabove. In the embodiment disclosed in Figs. 27 to 30, a suitable adjustable draft restricting device indicated generally at 102 is arranged in the flue passageway 100 within the foot 486'. Such draft restricting device may be like that disclosed in Fig. 2 or like that disclosed in any of the other embodiments of the invention and may be adjusted either manually or automatically as disclosed in the other embodiments of the invention. Similarly, any of the controls herein disclosed may be utilized in the constructions illustrated in Figs. 23 to 30, depending upon the type of fuel used. The constructions illustrated in Figs. 23 and 30 include a thermostatic switch 122 for controlling the circuit of the motor 120 of the blower 70, but it is to be understood that any other type of control for the blower herein disclosed or otherwise suitable might be used.

The length of the heat exchanger in all of the embodiments is such that the flue gases will be reduced to a temperature in the neighborhood of 300° F. when the flue gases leave the upper end of the heat exchanger. Regardless of the particular form of control circuit utilized for the fan motor, the fan should operate whenever the flue gas temperature at the upper end of the heat exchanger is approximately 225° F. or greater, and the fan should be cut out when the flue gas temperature at the upper end of the heat exchanger is 200° F. or less. The pilot flame for the oil and gas burner herein disclosed should be of such a size that sufficient heat to require the operation of the blower will not be generated; in other words, when the burners are operating on pilot flame the flue gas temperature at the upper end of the flue passageway should be less than 200° F.

In the various embodiments herein disclosed the heat exchanger is formed of metal and the pipe of which the heat exchanger is formed, except for the foot, may be provided with a porcelain coating both internally and externally.

This application is a continuation in part of my prior co-pending application Serial No. 399,780, filed June 26, 1941, for "Heating apparatus," now Patent No. 2,274,341, issued February 24, 1942.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

In all of the embodiments of the invention herein disclosed, the chimney or flue is so constructed as to produce a potentially high draft materially greater than that required to efficiently burn fuel in the combustion chamber under natural draft operation and the draft restricting device is employed to restrict the effective draft in the combustion chamber to that required for efficiently burning whatever kind of fuel may be employed and to prevent the passage through the combusion chamber and flue of large amounts of air which are not necessary to support combustion and which would impair the efficient recovery of heat by the system from the products of combustion before being vented to atmosphere. In all cases the air inlet to the combustion chamber preferably should be limited and controlled with due regard to the particular kind of fuel employed.

I claim:

1. A heating system for supplying heated air to a space in a building to be occupied by and for the comfort of human beings comprising a chimney which forms part of the building and which extends upright to and above the roof of the building and has an atmospheric discharge external of the space, a combustion chamber in the lower portion of said chimney, means associated with said combustion chamber and constructed and arranged for burning fuel so as to generate heated products of combustion, a heat exchanger member extending longitudinally of and for a substantial portion of the length of said chimney, said heat exchanger member and chimney providing a path through which the products of combustion flow to said atmospheric discharge and a separate unidirectional path for flow of air in intimate countercurrent heat exchange relationship with at least a part of said combustion products path, an outlet from the lower end of said air path into said space, said air path having an air inlet at the upper end thereof, means including an air moving device operable to supply from said space to said air inlet of said air path, air to be heated and under a pressure greater than the pressure of the products of combustion, and means for dissipating heat from the heat exchanger member when the air moving device is not operating when said fuel burning means are generating heated products of combustion, said heat dissipating means comprising an air relief vent at the inlet end of said air path adapted to open externally of the space, to which heated air is supplied through said outlet, for venting said air path and space.

2. A heating system for supplying heated air to a space in a building to be occupied by and for the comfort of human beings comprising a chimney which forms part of the building and which extends upright to and above the roof of the building and has an atmospheric discharge external of the space, a combustion chamber at the lower portion of said chimney, and having means associated therewith which are constructed and arranged for burning fuel so as to generate heated products of combustion, a heat exchanger member extending longitudinally of and for a substantial portion of the length of said chimney, said heat exchanger member and chimney providing a path for the flow of the products of combustion and a separate unidirectional path for flow of air in intimate countercurrent heat exchange relationship with the combustion products, an outlet from the lower end of said air path for discharging heated air into said space, means including an air moving device operable to supply from said space to the upper portion of said air path, air to be heated and under a pressure greater than the pressure of the products of combustion, an electrically operated source of power for operating said air moving device, and an electric circuit therefor including a thermostatic switch positioned in said chimney adjacent the upper end of said heat exchanger member and responsive to heat generated by said heating system so that said power source will operate said air moving device in response to an increase in temperature in the chimney above a predetermined point and will discontinue operation of said air moving device in response to a decrease in temperature in the chimney below a predetermined point.

3. A heating system for supplying heated air to a space in a building to be occupied by and for the comfort of human beings comprising a chimney which forms a part of the building and which extends upright to and above the roof of the building and has an atmospheric discharge external of the space, said chimney being constructed so as to produce a high potential draft, a combustion chamber in the lower portion of said chimney, means associated with said combustion chamber and constructed and arranged for burning fuel under natural draft operation so as to generate heated products of combustion, a heat exchanger member extending longitudinally of and along a substantial portion of the length of said chimney, said exchanger member and chimney providing a path for the flow of the products of combustion from said combustion chamber to said atmospheric discharge and a separate unidirectional path for flow of air in intimate countercurrent heat exchange relationship with the path for flow of the combustion products, an outlet from the lower end of said air path discharging into said space, means including an air moving device operable to supply to the upper portion of said air path, air to be heated and under a pressure greater than the pressure of the products of combustion, and a draft restricting device in said combustion products path for restricting the effective draft in the combustion chamber to that required for efficiently burning fuel therein and which will prevent the passage through the combustion chamber and chimney of large amounts of air which are not necessary to support combustion.

4. A heating system for supplying heated air to a space in a building to be occupied by and for the comfort of human beings comprising a chimney which forms a part of the building and which extends upright to and above the roof of the building and has an atmospheric discharge external of the space, said chimney being constructed so as to produce a high potential draft, a combustion chamber at the lower portion of said chimney, means associated with said combustion chamber and constructed and arranged for burning fuel under natural draft operation so as to generate heated products of combustion, a heat exchanger member extending longitudinally of and along a substantial portion of the length of said chimney, said exchanger member and chimney providing a path for the flow of the products of combustion from said combustion chamber to said atmospheric discharge and a separate path for flow of air in intimate countercurrent heat exchange relationship with the path for flow of the combustion products, openings at the lower and upper ends of said air path communicating with said space, means outside of said chimney to supply from said space to one of said openings, air to be heated and under a pressure greater than the pressure of the products of combustion, the opening at the other end of said air path forming an outlet for discharging heated air into said space, and a draft restricting device in said combustion products path for restricting the effective draft in the combustion chamber to that required for efficiently burning fuel therein and which will prevent the passage through the combustion chamber and chimney of large amounts of air which are not necessary to support combustion, said draft restricting device comprising a series of spaced baffle plates arranged in vertical spaced relationship and at the center of said combustion products path so as to define restricted passages for the combustion products adjacent to and extending around the inner periphery of said heat exchanger member.

5. In a heating system for a building for human occupancy having a room and an attic space, a chimney extending upward above the roof, a substantially straight heat exchanger member within the chimney and extending longitudinally of and for a substantial portion of the length thereof, a combustion chamber below said exchanger member and having means associated therewith which are constructed and arranged for burning fuel so as to generate heated products of combustion, said chimney and said exchanger member providing separate parallel counterflow ducts through which said combustion products and air to be heated flow in heat exchange relationship, an air feeding conduit leading through said attic space to the upper end of said air duct and having an inlet communicating with the space in said room, an outlet from the lower end of said air duct for discharging heated air into said room, said air duct having an inlet at the upper end thereof, an air moving device in said attic space and intercalated in said feeding conduit and operable for discharging air from said room inlet into said exchanger air duct through the inlet thereof under pressure greater than the pressure of the combustion products so that any leakage of the exchanger member will be of air into the combustion products duct, and means for dissipating heat from the heat exchanger member when the air moving device is not operating when said fuel burning means are generating heated products of combustion at a substantial rate, said heat dissipating means comprising an air relief vent at the inlet of said air duct adapted to open externally of the space, to which heated air is supplied through said outlet, for venting said air duct and space.

6. In a heating system for a building for human occupancy having a room and an attic space, a chimney extending upward above the roof, a substantially straight heat exchanger member within the chimney and extending longitudinally of and for a substantial portion of the length thereof, a combustion chamber in the lower portion of said chimney, means associated with said combustion chamber and constructed and arranged for burning fuel and functioning to supply heated products of combustion to said chimney, said chimney and said exchanger member providing parallel counterflow ducts for the combustion products and for air to be heated, an air feeding conduit leading through said attic space to the upper end of said air duct and having an inlet communicating with the space in said room, an outlet from the lower end of said air duct and discharging into said room, an air moving device in said attic space and intercalated in said feeding conduit and operable for discharging air from said room inlet into said exchanger air duct under pressure greater than the pressure of the combustion products so that any leakage of the exchanger will be of air into the combustion products duct, means for operating said air moving device when the fuel input to said fuel burning means is increased and for rendering said air moving device inoperative when the fuel input to said fuel burning means is decreased, and means for dissipating heat from said heat exchanger member externally of the space to which heat is supplied through said outlet, when said air moving device is not operating as aforesaid.

7. In a heating system for a building for human occupancy having a room and an attic space, a chimney extending upward to an atmospheric vent above the roof, a substantially straight heat exchanger member within the chimney and extending longitudinally of and for a substantial portion of the length thereof, a combustion chamber below said exchanger member, means associated with said combustion chamber and constructed and arranged for burning fuel and functioning to supply heated products of combustion to said chimney, said chimney and said exchanger member providing separate parallel ducts in heat exchange relationship through which said combustion products and air to be heated flow, an air conduit leading through said attic space and connecting the upper end of said air duct and an opening in a wall of said room, said air duct having an air inlet at the upper end thereof, a communication between the lower end of said air duct and said room and forming an outlet for discharging heated air thereinto, an air moving device in said attic space and intercalated in said conduit and operable for circulating air from said room through said air duct inlet and exchanger member air duct under pressure greater than the pressure of the combustion products and back to said room, an electrically operated source of power for operating said air moving device, an electric circuit therefor including a thermostatic switch responsive to heat generated in said heating system, and means for dissipating heat from said heat exchanger member externally of said room when said air moving device is not operating as aforesaid in accordance with the heat generated in said heating system, said heat dissipating means comprising an air relief vent at the inlet of said air duct adapted to open externally of the space, to which heated air is supplied through said outlet, for venting said air duct and space.

8. A heating system for supplying heated air to a space in a building to be occupied by and for the comfort of human beings comprising a chimney which forms part of the building and which extends upright to and above the roof of the building and has an atmospheric discharge external of the space, a combustion chamber in the lower portion of said chimney, means associated with said combustion chamber and constructed and arranged for burning fuel and functioning to supply heated products of combustion to said chimney, a heat exchanger member extending longitudinally of and for a substantial portion of the length of said chimney, said heat exchanger member and chimney providing a path for the flow of the products of combustion and a separate unidirectional path for flow of air in intimate countercurrent heat exchange relationship with the combustion products, an outlet from the lower end of said air path into said space, means including an air moving device operable to supply to the upper end of said air path, air to be heated and under a pressure greater than the pressure of the products of combustion, and a damper controlled air relief vent at the upper end of said air path, said damper being movable to open position when said air moving device is stopped for opening said vent, said vent opening externally of the space to which heated air is supplied through said outlet so as, when open, to vent said air path and said space.

9. A heating system for supplying heated air to a space in a building to be occupied by and for the comfort of human beings comprising a chimney which forms part of the building and which extends upright to and above the roof of the building and has an atmospheric discharge external of the space, a combustion chamber at the lower portion of said chimney, means associated with said combustion chamber and constructed and arranged for burning fuel and functioning to supply heated products of combustion to said chimney, a heat exchanger member extending longitudinally of and for a substantial portion of the length of said chimney, said heat exchanger and chimney providing a path for the flow of the products of combustion and a separate unidirectional path for flow of air in intimate countercurrent heat exchange relationship with the combustion products, said air path having an outlet from the lower end of said air path into said space, means including an air moving device operable to supply to the upper portion of said air path, air to be heated and under a pressure greater than the pressure of the products of combustion, a vent and relief damper therefor at the upper end of said air path, said damper being adapted to be opened for venting said air path under certain conditions, and means responsive to chimney temperature and controlling operation of said air moving device, said damper being movable to closed position by air flow upon operation of said air moving device, said vent and relief damper being arranged on the intake side of said air moving device.

10. A heating system for supplying heated air to a space in a building to be occupied by and for the comfort of human beings comprising a chimney which forms part of the building and which extends upright to and above the roof of the building and has an atmospheric discharge external of the space, means providing a combustion chamber at the lower portion of said chimney and having means associated therewith which are constructed and arranged for burning fuel so as to generate heated products of combustion, a heat exchanger member extending longitudinally of and for a substantial portion of the length of said chimney, said heat exchanger member and chimney providing a path through which the products of combustion flow from said combustion chamber to said atmospheric discharge and a separate unidirectional path for flow of air in intimate heat exchange relationship with at least part of said combustion products path, said air path having an inlet at the upper end thereof, an outlet from the lower end of said air path for discharging heated air into said space, means, including an air moving device outside of said chimney, operable to supply from said space to said air path through the inlet thereof, air to be heated and under a pressure greater than the pressure of the products of combustion, and means for dissipating heat from the heat exchanger member when the air moving device is not operating when said fuel burning means are generating heated products of combustion at a substantial rate, said heat dissipating means comprising a relief vent at the inlet of said air path adapted to open externally of the space to which heated air is supplied through said outlet, for venting said air duct and space.

11. In a heating system for a building for human occupancy having a room and an attic space, a chimney extending upward above the roof, a substantially straight heat exchanger member within the chimney and extending longitudinally of and for a substantial portion of the length thereof, means providing a combustion chamber below said exchanger member, means associated with said combustion chamber and constructed and arranged for burning fuel so as to generate heated products of combustion, said chimney and said exchanger member providing separate parallel ducts through which said combustion products and air to be heated flow in countercurrent heat exchange relationship, an air conduit leading through said attic space and connecting the upper end of said air duct and an opening in a wall of said room, a communication between the lower end of said air duct and said room for discharging heated air thereinto, an air moving device in said attic space and intercalated in said conduit and operable for circulating air from said room through said exchanger member air duct under pressure greater than the pressure of the combustion products and back to said room, means for dissipating heat from the heat exchanger member if the air moving device does not operate when said fuel burning means are generating heated products of combustion, and means responsive to the temperature of the combustion products at the upper end of said heat exchanger member for controlling operation of said air moving device, said heat dissipating means including a vent at the upper end of said air duct and opening into said attic, and a damper controlling said vent, said damper being adapted to be opened for venting said air duct under certain conditions and to be closed when said air moving device is operating.

12. In a heating system for a building for human occupancy having a room and an attic space, a chimney forming a part of said building and extending upwardly to an atmospheric vent above the roof of said building, a heat exchanger member within the chimney and extending longitudinally and for a substantial portion of the length thereof, said exchanger member comprising an elongated, substantially straight tubular member, means providing a combustion chamber below said exchanger member and having means associated therewith which is constructed and arranged for burning fuel so as to generate heated products of combustion which are supplied under natural draft to the lower end of said exchanger member, said chimney and said exchanger member providing separate parallel ducts in countercurrent heat exchange relationship through which said combustion products and air to be heated flow, an air conduit leading to one end of the exchanger member air duct and having an inlet communicating with the space in said room, means providing an outlet from the other end of said exchanger member air duct for discharging heated air into said room, an air moving device intercalated in said air conduit and discharging air from said inlet into said air duct under pressure greater than the pressure of the combustion products so that any leakage of the exchanger member will be of air into the combustion products duct, means for dissipating heat from the heat exchanger member when the air moving device is not operating when said fuel burning means are generating heated products of combustion, said heat dissipating means comprising a relief vent at the upper end of said air duct, and an opening in the chimney adjacent the upper end of said heat exchanger and affording communication between said vent and atmosphere through said combustion products duct.

13. In a heating system for a building for human occupancy having a room and an attic space, a chimney forming a part of said building and extending upwardly to an atmospheric vent above the roof of said building, a heat exchanger member within the chimney and extending longitudinally of and for a substantial portion of the length thereof, means providing a combustion chamber below said exchanger member and having means associated therewith which are constructed and arranged for burning fuel so as to generate heated products of combustion which are supplied under natural draft to the lower end of said exchanger member, said chimney and said exchanger member providing separate parallel ducts in heat exchange relationship through which said combustion products and air to be heated flow, an air conduit leading to one end of said exchanger member air duct and having an inlet communicating with space in said room, means providing an outlet from the other end of said exchanger member air duct for discharging heated air into said room, an air moving device intercalated in said air conduit and discharging air from said inlet into said air duct under pressure greater than the pressure of the combustion products, means for dissipating heat from the heat exchanger member when the air moving device is not operating when said fuel burning means are generating heated products of combustion at a substantial rate, said heat dissipating means comprising a relief vent affording communication between the upper end of said air duct and said attic space, and means affording an open communication between said attic space and the atmosphere externally of said building.

14. A heating system for supplying heated air to a space in a building to be occupied by and for the comfort of human beings comprising a chimney which forms part of the building and which extends upright to and above the roof of the building and has an atmospheric discharge external of said space, a heat exchanger member within the chimney and extending longitudinally of and for a substantial portion of the length thereof, said chimney and heat exchanger member providing separate parallel ducts in heat exchange relationship through which combustion products and air to be heated flow, means providing a combustion chamber having means associated therewith which are constructed and arranged for burning fuel so as to generate heated products of combustion which are supplied to the lower end of said combustion products duct, an air conduit leading to the upper end of said air duct and having an inlet communicating with said space, means providing an outlet from the other end of said air duct for discharging heated air into said space, an air moving device in said conduit and operable for discharging air from said inlet into said air duct under a pressure greater than the pressure of the combustion products in said combustion products duct, an electrically operated source of power for operating said air moving device, an electric circuit therefor including a thermostatic switch responsive to heat generated in said heating system, and means for dissipating heat from said heat exchanger member externally of said space when said air moving device is not operating.

MORITZ L. MUELLER.